(12) United States Patent
Tassa

(10) Patent No.: US 6,914,936 B1
(45) Date of Patent: Jul. 5, 2005

(54) METHOD FOR ALLOCATING MEDIA UNIT SEQUENCES AMONG A PLURALITY OF OUTPUT CHANNELS

(75) Inventor: Tamir Tassa, Givatayim (IL)

(73) Assignee: BigBand Networks, Inc., Redwood City, CA (US)

(*) Notice: Subject to any disclaimer, the term of this patent is extended or adjusted under 35 U.S.C. 154(b) by 668 days.

(21) Appl. No.: 09/909,490

(22) Filed: Jul. 19, 2001

(51) Int. Cl.$^7$ ................................................. H04N 7/12
(52) U.S. Cl. ................................................. 375/240.02
(58) Field of Search ...................... 375/240.02, 240.04, 375/240.05, 240.29, 240.26; 348/423.1, 385.1, 387.1, 388.1, 390.1, 419.1; 370/464, 468, 391, 487; 725/94–95

(56) References Cited

U.S. PATENT DOCUMENTS

| | | | |
|---|---|---|---|
| 5,115,309 A | * | 5/1992 | Hang ....................... 348/388.1 |
| 5,231,484 A | * | 7/1993 | Gonzales et al. ......... 375/240.04 |
| 5,550,590 A | * | 8/1996 | Sakazawa et al. ........ 348/386.1 |
| 5,910,942 A | * | 6/1999 | Grenot et al. .............. 370/236 |
| 6,094,457 A | | 7/2000 | Linzer et al. ................ 375/240 |
| 6,240,103 B1 | * | 5/2001 | Schoenblum et al. ....... 370/468 |
| 6,411,602 B2 | * | 6/2002 | Schoenblum et al. ....... 370/232 |
| 2001/0014122 A1 | * | 8/2001 | Fu et al. ................. 375/240.12 |
| 2001/0055302 A1 | * | 12/2001 | Taylor et al. ............... 370/386 |

OTHER PUBLICATIONS

Drury et al., "Picture quality and multiplex management in digital video broadcasting system", International Broadcasting Convention, IEEE, pp. 397–402, Sep. 1996.*

Jordan et al., "Analysis, modelling and performance prediction of digital video statistical multiplexing", International Broadcastin Convention, IEEE, pp. 553–559, Sep. 1997.*

* cited by examiner

Primary Examiner—Vu Le
(74) Attorney, Agent, or Firm—Blakely, Sokoloff, Taylor & Zafman LLP.

(57) ABSTRACT

A method for allocating media unit sequences, such as MPEG compliant programs, among a plurality of output channels, especially in an allocation unit environment. The method including the steps of: (I) Generating previous media unit sequence behavior pattern information. (II) Estimating at least one aspect of a predicted overflow in at least two output channels, in response to (a) at least a portion of the previous media unit sequence behavior pattern information, and (b) at least two potential allocations of media unit sequences, and (III) Selecting a selected allocation out of the at least two potential allocations in response to the at least one aspect of the predicted overflow. Conveniently, the selected allocation is the best allocation in respect of the at least one aspect.

64 Claims, 3 Drawing Sheets

METHOD FOR ALLOCATING MEDIA UNIT SEQUENCES AMONG A PLURALITY OF OUTPUT CHANNELS

BACKGROUND OF THE INVENTION

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures, each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

MPEG compression/encoding utilizes various compression schemes, such as adaptive quantization, intra-frame encoding, inter-frame encoding, run length encoding and variable length encoding. Intra-frame encoding takes advantage of spatial redundancies in a picture. Inter-frame encoding takes advantage of temporal redundancies from picture to picture in a video sequence. Inter-frame encoding involves motion estimation and motion compensation. There are three types of motion estimations—forward, backward and bi-directional. Macroblocks are the elementary unit for motion compensation and adaptive quantization. Each macroblock is associated with a quantization factor field, representative of the degree of quantization. A slice, including a plurality of macroblocks includes a slice header that has a quantization factor field that is associated with some of the macro blocks of the slice.

Elementary streams are packetized to produce PES packets. PES packets made up of elementary streams that form a program share a common time base. The PES packets may also include additional information. PES packets of distinct elementary streams can be arranged as either a Program Stream or a Transport Stream. At least one or more stream of PES packets having a common time base are usually combined to a Program Stream. A Transport Stream combines one or more programs with one or more independent time bases into a single stream. Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

Transport Streams may be of either fixed or variable bit rate. Some programs of the Transport Stream are of a variable bit rate, if, for example, more bits are allocated to complex scenes, and less bits are allocated to more simple scenes.

Program Streams and Transport Streams are provided, usually via a communication medium, to a target decoder, that decodes the encoded elementary streams within the Program Stream or the Transport Stream.

The ISO/IEC 13818-1 specification defines a channel as a digital medium that stores or transports a Transport or a Program Stream. The aggregate bandwidth of all the components of the Transport Stream must not exceed, at any time, the available bandwidth of the channel. Transport Streams are provided to a channel of a limited available bandwidth/storage space.

Various lossy and lossless techniques are implemented to adapt the aggregate bandwidth of the programs of a Transport Stream to the available bandwidth of a channel. Lossless techniques, such as statistical multiplexing, do not require further compressing of media pictures. Lossless techniques also include delaying or advancing a transmission of transport packets. Lossy techniques involve additional compression, and are usually implemented whenever the appliance of lossless techniques is not feasible or does not provide sufficient results. The further compression usually results in visual quality degradation.

Media unit sequences, such as but not limited to programs, can be allocated via devices that have a plurality of inputs and a plurality of outputs.

There is a need to provide a method that allows for allocating media unit sequences in a manner that reduces data reductions. There is a need to provide an optimal method for allocating media unit sequences among a plurality of output channels in a manner that reduces at least one aspect of output channels overflows.

SUMMARY OF THE PRESENT INVENTION

It is an object of the present invention to provide novel methods for allocating media unit sequences among a plurality of output channels, the method including the steps of: (a) generating previous media unit sequence behavior pattern information; (b) estimating at least one aspect of a predicted overflow in at least two output channels, in response to the previous media unit sequence behavior pattern information and in response to at least two potential allocations; (c) selected allocation out of the at least two potential allocations in response to the at least one aspect of the predicted overflow.

BRIEF DESCRIPTION OF THE DRAWINGS

The present invention will be understood and appreciated more fully from the following detailed description taken in conjunction with the drawings in which.

DETAILED DESCRIPTION

Figure 1:
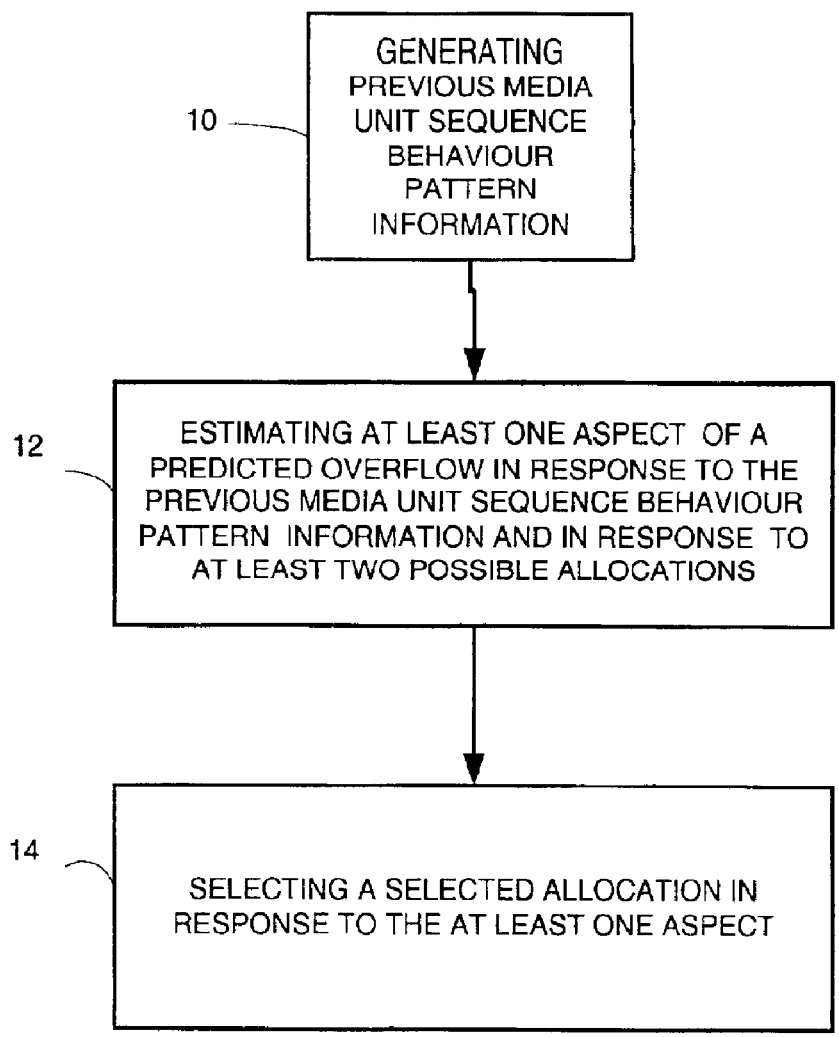
FIG. 1 is a flow chart illustrating a method for allocation of media unit sequences, in accordance to a preferred embodiment of the invention.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a method for allocating media unit sequences among a plurality of output channels, the method including (a) generating previous media unit sequence behavior pattern information, (b) for each of a plurality of possible allocations estimating an aspect of an overflow and (c) selecting a selected allocation out of the plurality of possible allocations in response to at least one aspect of the estimated overflow. Conveniently the selected allocation is the best allocation out of the plurality of possible allocations in view of at least one aspect of the overflow.

The following are definitions and abbreviations, which are used throughout the description of the disclosed technique:

Media unit: Set, group or collection of representations of media signals. The media signals can be video, audio and/or data. For example, media units can include macroblocks, slices, packets, packs and the like. A sequence of media units can include at least one elementary stream, at least one program, distinct programs generated from the same media source and the like.

Output channel: Digital medium utilized for storing and/or transmitting at least one sequence of media units. An output channel is characterized by an available capacity. The capacity can reflect an available space, bandwidth and/or bit rate. $C_l$: the available capacity of an l'th output channel. Index l ranges between 1 and k. Value k denoting the number of output channels. Conveniently, the available capacities of the k output channels are represented by $\vec{C}$ whereas $\vec{C} = (C_l, \ldots C_k)$.

Previous media unit sequence behavior pattern information (B): Information reflecting at least one behavior pattern of at least one media unit sequence during at least one previous time period. Each of said behavior patterns can be expressed in terms of size, required bit rate, quality and the like or any combination of said terms. The information can be generated by applying various processing methods, such as statistical methods, probabilistic methods and the like. Accordingly, the behavior pattern can be expressed by a local (over at least one predefined time period) average value, local maximal value, local minimal value, global average value, global maximal value, global minimal value, a local flatness value, local variance, global flatness value, a global flatness value, a local expected value, a local moment of a given allocation, a global expected value, a global moment of a given allocation and the like.

$B_{i,j}$: Information reflecting the behavior pattern of an i'th media unit sequence during a previous j'th time period. Index i ranging between 1 and n, index j ranging between 1 and m. $B_{i,j}$ is also referred to as the basic information unit.

It is noted that the m time periods can define a cycle period, and that there is a correlation between the behavior patterns of media unit sequences during the previous j'th time period and (j+q*m)'th time period, q being a positive integer. For example, assuming that (a) the cycle period equals 24 hours, (b) each time period equals 15 minutes, (c) each media unit sequence is an MPEG compliant program that is broadcast from the same provider (such as CNN, NBC and the like), then the information reflecting the behavior pattern of an i'th program at a given time period, such as Monday 8:00–8:15 can predict the behavior pattern of the i'th program during Tuesday 8:00–8:15.

$\vec{B_i} = (B_{l,1}, \ldots B_{l,m})$.: Information reflecting the behavior pattern of the i'th media unit sequence during the first previous time period till the m'th previous time period. $\vec{B_i}$ is also referred to as basic information unit sequence.

Aggregate estimated output channel required capacity ($T_l$): Estimation of the total capacity of an output channel required to store and/or transmit at least one media unit sequence. The estimation is based upon information reflecting the behavior pattern of each of the at least one media unit media sequences. Assuming that (a) $V_l$ is the subset of indices of media unit sequences that are allocated to the l'th output channel, and that (b) the aggregate estimated l'th output channel required capacity can be calculated by summing basic information units of media unit sequences scheduled to be provided to the l'th output channel, then the aggregate estimated required capacity of the l'th output channel is:

$$\vec{T_i} = \sum_{i \in V_i} \vec{B_i}.$$

Relevant maximum—Given a distribution and given a percentage value p, 0%<=p<=100%, the relevant maximum is the lowest value that is greater than or equals to p percents of the instances of the distribution. It is noted that when p=100%, the relevant maximum coincides with the regular definition of maximum. Conveniently, an relevant maximum may be used, with an appropriate value of p close to 100%, in order to get the maximum over all instances of the distribution, apart from a small subset of the greatest instances that might be considered as negligible or erroneous overshoots.

According to an aspect of the invention a step of allocating media unit sequences among a plurality of output channels is preceded by a step of generating previous media unit sequence behavior pattern information.

It is assumed, for convenience of explanation only, that the previous media unit sequence behavior pattern information reflects an average size of n media unit sequences during m consecutive time periods. Accordingly, $B_{i,j}$ reflects an average size of the i'th media unit sequence during the previous j'th time period.

For convenience of explanation, mathematical symbols and operations used in the following description are introduced.

For x being an integer, a max zero operation is defined as finding the greater value out of x and zero. $(x)_+ = \max\{x, 0\}$.

For X being a vector including components $x_j$ where index j ranging between 1 and m, and for s being any number greater than or equal to 1, the s-norm of X is defined herein as.

$$\|\vec{X}\|_s = \left( \sum_j \{(x_j)_+^s\} \right)^{1/s}.$$

The s-norm of X when s equals infinity is defined herein as. $\|\vec{X}\|_\infty = \max(x_j)_+$.

Given a vector X of length m, the vector dX is defined as the vector of length (m−1) that represents the differences of the components of X. Specifically, $$\vec{dX} = (dx_1, dx_2, \ldots, dx_{m-1}) \text{ where } dx_j = |x_{j+1} - x_j|, j = 1, \ldots, m-1.$$

The (s,w)-norm of a vector X, where s is any number in the range $1 \leq s \leq \infty$ and w is any positive weight-factor, is defined herein as: $\|\vec{X}\|_{s,w} = \|\vec{X}\|_s + w \cdot \|\vec{dX}\|_s$.

The (s,w)-norm is a generalization of the s-norm that takes into account not only the size of the vector in question but also the size of its variation. The (s,w)-norm coincides with the s-norm when w=0.

Given a vector X and a scalar a, X+a is the vector that is obtained by adding a to each of the components of X.

Given two vectors X and Y of the same length, X·Y indicates a vector of the same length, the j'th component of which equals the j'th component of X multiplied by the j'th component of Y. Similarly, X/Y denotes the vector whose j'th component equals the j'th component of X divided by the j'th component of Y.

A variation norm of a vector X is any measure of the variation in the components of X. Conveniently, this norm coincides with the regular'statistical variance, defined as:

$$\langle \vec{X} \rangle = \frac{1}{m} \sum_{j=1}^{m} (x_j - \mu)^2 \text{ where } \mu = \frac{1}{m} \sum_{j=1}^{m} x_j$$

Other examples for such norms include, but are not limited to, $$\langle \vec{X} \rangle = \frac{\||\vec{X}\|_\infty - \vec{X}\|_1}{\|\vec{X}\|_\infty} \text{ or}$$

$$\langle \vec{X} \rangle = \frac{1}{m} \sum_{j=1}^{m} |x_j - \mu| \text{ or}$$

$$\langle \vec{X} \rangle = \|\vec{dx}\|_s \text{ where } 1 \leq s \leq \infty$$

or $$\langle \vec{X} \rangle = \|\vec{dx}\|_s \text{ where } 1 \leq s \leq \infty$$

Overflow: a case where the amount of media signals that are scheduled to be transmitted (or stored) over an output channel exceeds the output channel capacity.

A Predicted overflow is an estimation of an overflow in response to previous media unit sequence behavior pattern information. Assuming that $T_l$ is the aggregate estimated output channel required capacity for l'th output channel and that $C_l$ is the available capacity of the l'th output channel, then the predicted overflow is given by: $(\vec{T}_l - C_l)_+$. A positive component of the predicted overflow of the l'th output channel reflects cases where the aggregate predicted l'th output channel required size $T_l$ exceeds the capacity of the l'th output channel $C_l$.

A normalized predicted overflow vector for the l'th output channel, $NOF_l$, equals a predicted overflow for the l'th output channel, divided by an appropriate scaling factor, in order to provide an estimation of the required compression ratio of media signals that are sent to the l'th output channel. Conveniently, $NOF_l$ can be defined by any of the following equations or a combination of at least one of the following equations:

$$\overrightarrow{NOF_l} = \frac{(\vec{T}_l - C_l)_+}{c_l} \quad \text{(i)}$$

$$\overrightarrow{NOF_l} = \frac{(\vec{T}_l - C_l)_+}{\vec{T}_l} \quad \text{(ii)}$$

$$\overrightarrow{NOF_l} = \frac{(\vec{T}_l - C_l)_+}{C_l - A_l} (A_l \text{ is defined below}) \quad \text{(iii)}$$

$$\overrightarrow{NOF_l} = \frac{(\vec{T}_l - C_l)_+}{\vec{T}_l - A_l} \quad \text{(iv)}$$

-continued $$\overrightarrow{NOF_l} = \frac{(\vec{T}_l - C_l)_+}{1} \quad \text{(v)}$$

(i.e., a uniform normalization factor is applied to all output channels).

In items (iii) and (iv) above the quantity $A_l$ represents a constant (i.e., non-compressible) component of the aggregate required size $T_l$ whereas $(T_l - A_l)$ represents the varying component (i.e., the component on which compression may be applied).

Conveniently, it is possible to modify the normalized predicted overflow vector per output channel, $NOF_l$, by incorporating into it factors that could be of significance. Three exemplary modifications of that sort are described below:

(vi) Multiplying the normalized predicted overflow vector $\overrightarrow{NOF_l}$ by a vector $\vec{W}$ including weight factors of the m time periods, for allowing to emphasize the importance of the behavior during certain time periods.

(vii) Multiplying the normalized predicted overflow vector $\overrightarrow{NOF_l}$ by a scalar $P_l$ whereas the scalar $P_l$ reflects predefined priorities of media unit sequences that are allocated to the l'th output channel. Usually, $P_l$ is the average priority of the media unit sequences that are allocated to the l'th output channel.

(viii) By taking into account that the given quality of media unit sequences may vary in time and that such an input quality may have an effect on the priority of the corresponding media unit sequence, one may represent this quality in vector terms, where each component represents the average quality of the given media unit sequence along the corresponding time period. There is a plurality of means to quantify the quality of a media unit sequence along a given time period, for example, by averaging the reciprocal of quantizer scales that were used in the media unit sequence along the given time period (since small quantizer scales imply high quality and vice-versa).

One may combine those quality vectors with the predefined priority of a media unit sequence in order to produce a priority vector for that media unit sequence. Such a combination operation could take into account that along time periods where the quality measure was low, the predefined priority should be, increased in order to reduce the chances that further reduction of quality is applied to that media unit sequence in those time periods. On the other hand, in time periods where the quality measure was high, the predefined priority should be decreased by that combination operation in order to allow more reduction of quality on those media unit sequences in those time periods.

Finally, given an allocation of programs to the l'th output channel, their expected behavior vectors $\vec{B}_i$ and their priority vectors as described above, it is possible to predict the percentage of rate reduction that would be applied to each media unit sequence in each time period and then produce a vector $\overrightarrow{NOF_l}$ where the j'th component (j ranges from 1 to m) reflects the weighted average of rate reduction, the average being taken over all media unit sequences allocated to the l'th output channel and the weight of each media unit sequence is its priority at the j'th time period.

According to an aspect of the invention the media unit sequences are if allocated among output channels in a manner that optimizes at least one aspect of a normalized predicted overflow. Usually, a plurality of possible allocations is provided, the at least one aspect is calculated for the possible allocations and the possible allocation that is associated with the best value of said aspect is selected. The allocation can also optimize a combination of at least one aspect of the normalized predicted overflow. Such a combination can include various mathematical operations, such as addition, subtraction, multiplication, division, raising by either a positive, negative or fractional power, composition and the like.

The aspect can relate to peak values of the normalized predicted overflow, to the "flatness" of the predicted overflow, to mean values of the normalized predicted overflow pattern, to the variance of the predicted overflow, to moments of the predicted overflow allocation, to moments of the mean of the predicted overflow allocation, and the like.

According to an aspect of the invention, the above mentioned optimization can be performed by minimizing any of the following exemplary target functions (denoted TF) or any combination of at least one of the following exemplary functions:

$$TF = \max_{1 \leq l \leq k} \|\overrightarrow{NOF_l}\|_s, \text{ whereas } s \geq 1 \text{ or } s = \infty \quad \text{(ix)}$$

$$TF = \sum_{l=1}^{k} \|\overrightarrow{NOF_l}\|_s, \text{ where } s \geq 1 \text{ or } s = \infty \quad \text{(x)}$$

$$TF = \max_{1 \leq l \leq k} \|\overrightarrow{NOF_l}\|_{s,w} \text{ where } s \geq 1 \text{ or } s = \infty \text{ and } w > 0 \quad \text{(xi)}$$

$$TF = \sum_{l=1}^{k} \|\overrightarrow{NOF_l}\|_{s,w} \text{ where } s \geq 1 \text{ or } s = \infty \text{ and } w > 0 \quad \text{(xii)}$$

As an example to one of the plurality of target functions that may be derived by the above guidelines, the target function that is obtained by applying the NOF in (iv), augmented by options (vi) and (vii), and using the aspect in (xi) is as follows:

$$TF = \max_{1 \leq l \leq k} \left( \left\| \frac{(\overrightarrow{T_l} - C_l)_+}{\overrightarrow{T_l} - A_l} \cdot \overrightarrow{W} \right\|_{s,w} \cdot P_l \right)$$

It is noted that the target functions above reflect various aspects of the predicted overflow. According to another aspect of the invention the target function and the allocation scheme can also be responsive to the bandwidth utilization of the output channels. For example, some of the target functions can also respond to bandwidth utilization by emitting the max zero operation.

If both the output channels capacity patterns (in cases where the output channel capacity varies over time) and the aggregate predicted output channel required sizes are graphically illustrated then the predicted overflow of each output channel is visualized as the spaces that are both above the output channel capacity pattern and below the aggregate predicted output channel required size. Graphically speaking, the media unit sequences are allocated among output channels in a manner that minimizes at least one aspect of these spaces. The aspect can relate to the volume, height, slope of at least a single space related to a single output channel, or to any statistical or probabilistic aspect of these spaces. For example, a first allocation scheme may aim to minimize the average estimated overflow across all the output channels. This average estimated overflow equals the sum of volumes of all the spaces associated to all output channels (this is implemented by the target function in (x) with s=1). A second allocation scheme can aim to minimize the maximal output channel estimated overflow. This maximal output channel estimated overflow is calculated by finding the output channel that has the largest sum of space volumes (this corresponds to the target function in (ix) with s=1). A third allocation scheme can aim to minimize the maximal value (peak) of an output channel estimated overflow. The peak is the maximal height of a space associated with the output channel (this corresponds to (ix) with s=∞). A fourth allocation scheme can aim to flatten the estimated overflow of at least one output channel. The flatness is reflected by the slopes of the contour of the spaces (this corresponds to any usage of the (s,w)-norm with any value w>0). Additional allocation schemes may take into account more than a single aspect, and can further respond to additional parameters such as media unit sequence priority, media unit sequence quality, time period weight and the like. Time period weight represents a weight that is given to statistics related to that time period. Assigning time period weights allows emphasizing the estimated overflow patterns during certain time periods, such as during prime time.

FIG. 1 illustrates a method 8 for allocating media unit sequences among a plurality of output channels. Method 8 including steps 10–14.

Step 10 including generating previous media unit sequence behavior pattern information.

Step 10 is followed by step 12 of estimating at least one aspect of a predicted overflow in at least two output channels, in response to the previous media unit sequence behavior pattern information and in response to at least two potential allocations of media unit sequences.

Step 12 is followed by step 14 of selecting a selected allocation out of the at least two potential allocations in response to the at least one aspect of the predicted overflow. Conveniently the selected allocation optimizes the at least one aspect of the predicted overflow. It is noted that previous media unit sequence behavior pattern can be dynamically updated by the behavior patterns of the currently allocated media unit sequences.

According to an aspect of the invention, the previous media unit sequence behavior pattern information represents the behavior patterns of a plurality media unit sequences over a plurality of time periods. The method then can include many calculations, especially if there are a large number of potential allocations, time periods and media unit sequences.

The amount of calculations can be reduced by breaking the two dimensional optimization problem (finding a best allocation for each time period and for each output channel) into two successive one-dimensional optimization problems. It is noted that different target functions or allocation criteria can be used during each of the one-dimensional stages.

Figure 2:
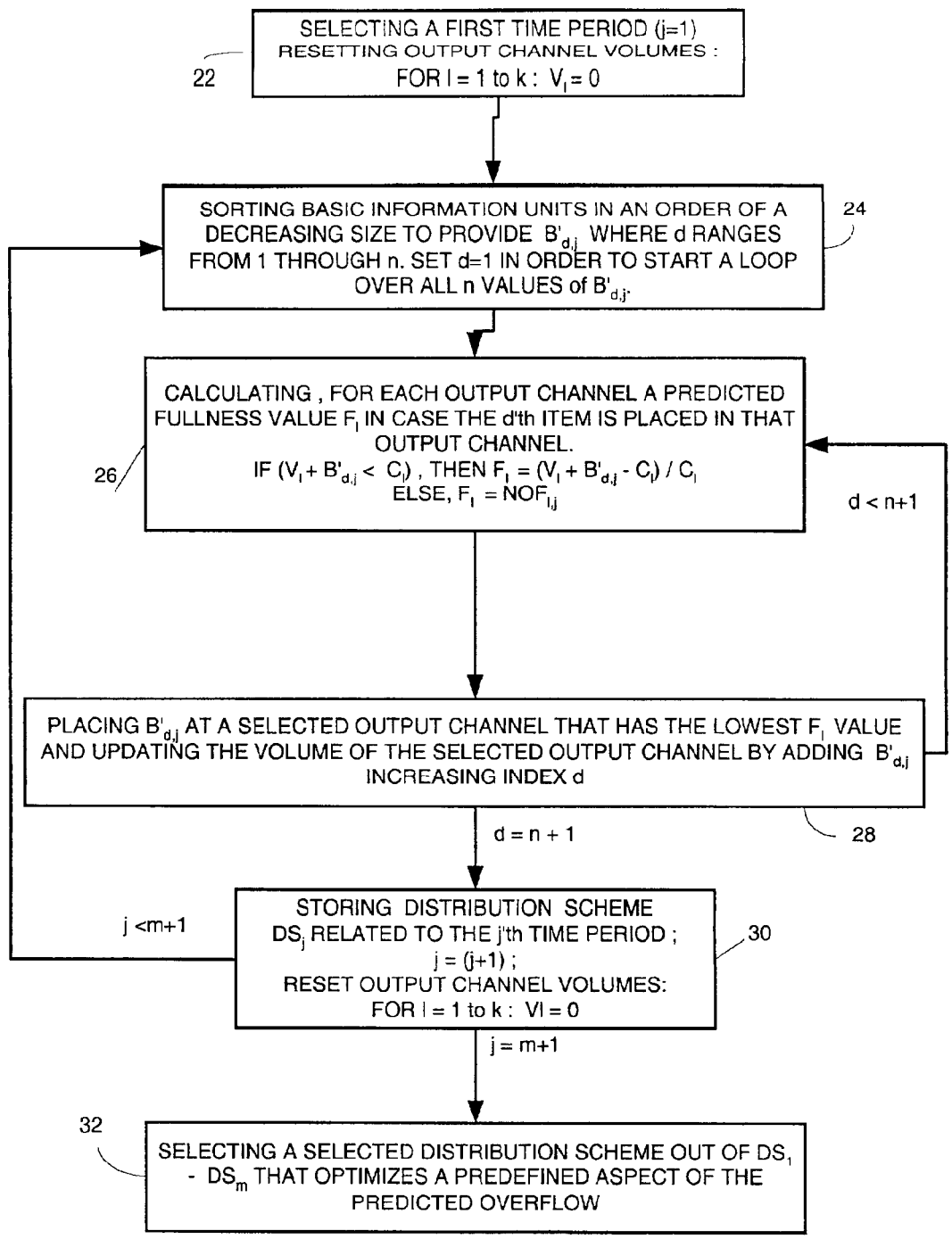
FIGS. 2–3 are flow chart diagram illustrating methods for generating a plurality of media unit sequences, in accordance with preferred embodiments of the invention.

FIG. 2 illustrates method 20 for allocating media unit sequences among a plurality of output channels, in accordance with another preferred embodiment of the invention. Method 20 starts by step 22 of selecting the first time period (i.e., setting j=1). Step 22 also includes setting output channel volume indication to zero, for each output channel out of the k output channels: $V_l=0$, $l=1, \ldots k$. Step 22 is followed by step 24 of sorting basic information units $B_{1,j}$–$B_{n,j}$ in an order of a decreasing size. For convenience of explanation the sorted items are denoted as $B'_{d,j}$, whereas the index d is ranging from 1 through n and $B'_{1,j}$ is the greatest basic information unit of the sorted basic information units.

Step 24 is followed by step 26 of calculating a predicted fullness value $F_l$ for the l'th output channel (l ranges between 1 and k), in case that the d'th sorted basic information unit, $B'_{d,j}$, is placed in the l'th output channel. The fullness value is calculated in one of two manners: if, by placing $B'_{d,j}$ in the l'th output channel no overflow is caused, $F_l = (V_l + B'_{d,j} - C_l)/C_l$. Otherwise, $F_l = NOF_{l,j}$ whereas $NOF_{l,j}$ is the j'th component of $NOF_l$, whereas $NOF_l$ can be calculated in various manners, such as but not limited to equations (i)–(viii).

Step 26 is followed by step 28 of placing $B'_{d,j}$ at a selected output channel that has the lowest predicted fullness value and incrementing the volume $V_l$ of the selected output channel by $B'_{d,j}$.

Step 28 includes increasing index d and jumping to step 26, until all $B'_{d,j}$ are placed within output channels. When all $B'_{d,j}$ are placed at output channels step 28 is followed by step 30 of storing the allocation scheme related to the j'th time period, setting output channel volume indication to zero, updating index j and jumping to step 24. It is noted that during m iterations of steps 24–28 m allocation schemes $DS_1$–$DS_m$ (an allocation scheme for each time period) are generated. Each of said allocation schemes is also referred to as a potential allocation.

Step 30 is followed by step 32 after $DS_1$–$DS_m$ are calculated. Step 32 includes selecting a selected allocation scheme out of $DS_1$–$DS_m$. Step 32 includes finding an allocation scheme that optimized at least one predefined aspect of a predicted overflow. For example step 32 can include calculating, for each allocation scheme out of $DS_1$–$DS_m$, a target function, such as the target functions mentioned above, or any predetermined combination of target functions, and selecting the allocation scheme that minimizes the predefined target function. It is noted that a single allocation scheme is selected and is further utilized for allocating media unit sequences during a plurality of time periods. In cases where the allocation scheme can dynamically change (usually when the change does not require to re-connect or re-arrange connectors and/or cables conveying media unit sequences) at least one allocation scheme can be selected. For example, an allocation scheme can be selected for each time period provided that the allocation scheme can be dynamically changed at each time period.

Figure 3:
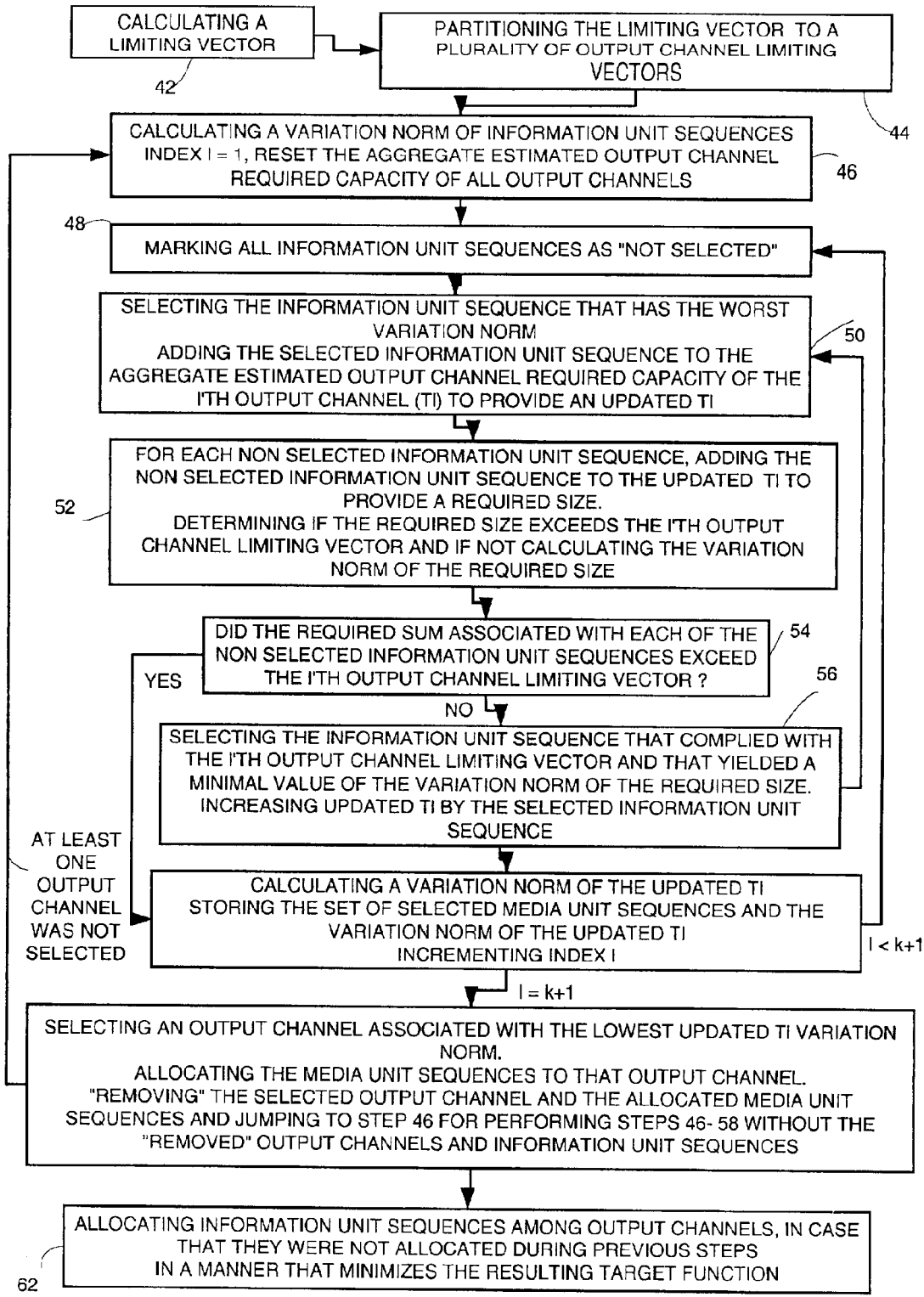

FIG. 3 illustrates a method 40 for determining an optimal allocation of media unit sequences, in accordance with another preferred embodiment of the invention.

Method 40 starts at step 42 of calculating a limiting vector LV representative of an unavoidable predicted overflow, the overflow is unavoidable in the sense that it can not be reduced by re-allocating media unit sequences among output channels.

$$\vec{LV} = (LV_1, \ldots, LV_m) \text{ where } LV_j = \left( \sum_{i=1}^{n} B_{i,j} - \sum_{i=1}^{k} C_i \right)_+ .$$

The unavoidable predicted overflow can be partitioned between the various output channels in various manners. Conveniently, step 42 is followed by step 44 of partitioning the unavoidable predicted overflow in proportion to the capacity of each output channel. The partition is reflected by a plurality of output channel limiting vectors $OCLV_l$ whereas index l ranges between 1 and k:

$$\vec{OCLV_l} = \left\{ \left( C_l \Big/ \sum_{r=1}^{k} C_r \right) \cdot \vec{LV} \right\} + C_l.$$

It is noted that during the following steps method 40 tries to find an allocation scheme in which the sum of $\vec{B}_i$ of all media unit sequences that are kg allocated to the l'th output channel is bounded by $\vec{OCLV_l}$.

Another choice of output channel limiting vectors is $\vec{OCLV_l} = C_l$, i.e., all components of l'th output channel limiting vector equal the capacity of l'th output channel, whereas index l ranges between 1 and k.

Step 44 is followed by a sequence of steps of calculating an allocation scheme for a single output channel (the l'th output channel) in view of the corresponding output channel limiting vector and variation norm of the aggregated information unit sequences allocated to that output channel.

The sequence starts at step 46 of calculating the variation norm of basic information unit sequences. For i=1 to n calculate the variation norm $<\vec{B}_i>$. Step 46 also includes resetting the vectors of required size of all output channels to 0, $T_l = 0$, whereas index l ranges from 1 to k. Finally, step 46 includes the setting index l to 1.

Step 46 is followed by step 48 of marking all information unit sequences as "not selected".

Step 48 is followed by step 50 of determining which information unit sequence has the worst variation norm. That information unit sequence, $\vec{B_i}$, is marked as "selected" and is added to the vector $T_l$, $\vec{T}_l = \vec{T}_l + \vec{B}i$.

Step 50 is followed by step 52 in which a loop is performed over all information unit sequences that are marked as "not selected". For each such unit sequence, letting j denote its index, a resulting required size vector $R_{l,j}$ is calculated as follows: $\vec{R}_{l,j} = \vec{T}_l + \vec{B}_j$. The vector $R_{l,j}$ is then compared to the vector $OCLV_l$ and if $\vec{R}_{l,j} \leq \vec{OCLV_l}$, the variation norm of $R_{l,j}$ is computed, $<\vec{R}_{l,j}>$.

Step 52 is followed by step 54 in which the results of the loop in step 52 are examined: if all "not selected" sequences violated the $OCLV_l$ limitation, i.e., $\vec{R}_{l,j} > \vec{OCLV_l}$, step 58 follows. Otherwise, step 56 follows.

In step 56 the "not selected" sequence that complied with the $OCLV_l$ limitation and yielded a minimal value of $<\vec{R}_{l,j}>$ is marked "selected" and the vector $T_l$ is updated according to $\vec{T}_l = \vec{R}_{l,j}$. Step 56 is then followed by step 50.

Step 58 is reached when no more information unit sequences may be added to l'th output channel without violating the $OCLV_l$ limitation. The set of programs that are marked "selected" is recorded and marked $S_l$. Index l is incremented, l=l+1. If l≤k step 48 is followed. Otherwise, step 60 is followed.

Step 60 is reached after all output channels were treated according to the procedure described in steps 48 through 58. The values $<\vec{T}_l>$ whereas the index l ranges from 1 to k, are compared. Letting q denote the index for which a minimal value of $<\vec{T}_l>$ is obtained, the information unit sequences that appear in $S_q$ are allocated to q'th output channel. Those information unit sequences are removed and so is the q'th output channel. If there are still output channels that were not removed in step 60 and if there are still information unit sequences that were not removed in step 60, step 46 follows. Otherwise, step 62 follows.

Step 62 is reached after all information unit sequences were allocated to output channels or if all output channels were removed in step 60 above. If there are still p information unit sequences that were not allocated, they are being spread among the k output channels according to the following greedy algorithm: for every i'th sequence, i=1, ..., p, and for every l'th output channel, l=1, ..., k, it is calculated what would be the value of the target function (i.e., the overflow aspect that the algorithm wishes to optimize) if the i'th sequence is allocated to the l'th output channel. Assuming that the minimal value was obtained for i=i* and l=l*, sequence number i* is allocated to output channel number l*. This process is then repeated (p−1) additional times until all sequences are allocated.

According to other aspects of the invention the potential allocation of media unit sequences respond to at least one allocation constraint.

Allocation constraints are related to the media unit sequences and/or to the output channels. The allocation constraints can reflect a relationship between a media unit sequence and at least one output channel or it can reflect a relationship between at least two media unit sequences. For example, media unit sequence limitations can include media unit sequences that must be provided to the same output channel, media unit sequences that can be provided to only some of the output channels, and the like.

The method can also be responsive to output channel limitations, such as a maximal number of media unit sequences per output channel, a maximal allowed overflow, a maximal allowed overflow ratio, and the like.

According to another aspect of the invention, the basic information unit reflect probabilistic characteristics of the behavior pattern of media unit sequences. Accordingly, the basic information unit sequences, $\vec{B}_i (i=1, \ldots, n)$, are composed of random variables. Consequently, so do the aggregate estimated output channel required capacity vectors, $\vec{T}_l (l=1, \ldots, k)$.

Accordingly at least some of the target functions will be in the form of expected values and the like. For example, the target function that is obtained by applying the NOF in (iv), augmented by options (vi) and (vii), and using the aspect in (xi) would be as follows:

$$TF = E\left\{ \max_{1 \leq l \leq k} \left( \left\| \frac{(\vec{T}_l - \vec{C}_l)_+}{\vec{T}_l - \vec{A}_l} \cdot \vec{W} \right\|_{s,w} \cdot P_l \right) \right\}$$

where E(x) denotes the expected value of the random variable x.

It will be apparent to those skilled in the art that the disclosed subject matter may be modified in numerous ways and may assume many embodiments other then the preferred form specifically set out and described above.

Accordingly, the above disclosed subject matter is to be considered illustratively and not restrictively, and to the maximum extent allowed by law, it is intended by the appended claims to cover all such modifications and other embodiments which fall within the true spirit and scope of the present invention.

The scope of the invention is to be determined by the broadest permissible interpretation of the following claims and their equivalents rather than the foregoing detailed description.

What is claimed is:

1. A method for allocating media unit sequences among a plurality of output channels, the method comprising the steps of:
    generating previous media unit sequence behavior pattern information reflecting at least one behavior pattern of at least one media unit sequence during at least one previous time period;
    estimating at least one aspect of a predicted overflow in at least two output channels from the plurality of output channels, in response to (a) at least a portion of the previous media unit sequence behavior pattern information, and (b) at least two potential allocations of media unit sequences among the plurality of output channels; and
    selecting a selected allocation out of the at least two potential allocations in response to the at least one aspect of the predicted overflow.

2. The method of claim 1 wherein the step of selecting comprising selecting a selected allocation that that optimizes the at least one aspect of the predicted overflow.

3. The method of claim 1 wherein the previous media unit sequence behavior pattern information reflects a size of at least one media unit sequence during at least one previous time period.

4. The method of claim 1 wherein the previous media unit sequence behavior pattern information reflects changes in the size of at least one media unit sequence during at least, one previous time period.

5. The method of claim 1 wherein the previous media unit sequence behavior pattern information reflects an average size of at least one media unit sequence during at least one previous time period.

6. The method of claim 1 wherein the previous media unit sequence behavior pattern information reflects a maximal size of at least one media unit sequence during at least one previous time period.

7. The method of claim 1 wherein the previous media unit sequence behavior pattern information reflects both a temporal size of at least one media unit sequence during at least one previous time period and a duration of time during which the at least one media unit was characterized by the temporal size.

8. The method of claim 1 wherein the previous media unit sequence behavior pattern information reflects a relevant maximum of at least one media unit sequence during at least one previous time period.

9. The method of claim 1 wherein the previous media unit sequence behavior pattern information reflects a size variance of at least one media unit sequence during at least one previous time period.

10. The method of claim 1 wherein the previous media unit sequence behavior pattern information reflects quality patterns of the media unit sequence during at least one previous time period.

11. The method of claim 1 wherein the step of estimating comprising a step of comparing an output channel estimated capacity and an aggregate estimated output channel required capacity, for each output channel out of the at least two output channels.

12. The method of claim 1 wherein an aspect of a predicted overflow is a peak value of the predicted overflow.

13. The method of claim 1 wherein an aspect of a predicted overflow is a flatness of the predicted overflow.

14. The method of claim 1 wherein an aspect of a predicted overflow is a mean value of the predicted overflow.

15. The method of claim 1 wherein an aspect of a predicted overflow is a variance of the predicted overflow.

16. The method of claim 1 wherein an aspect of a predicted overflow is at least one moment of the predicted overflow.

17. The method of claim 1 wherein an aspect of a predicted overflow is at least one moment of the mean value of the predicted overflow.

18. The method of claim 17 wherein $$\overrightarrow{NOF_l} = \frac{(\overrightarrow{T_l} - C_l)_+}{C_l}.$$

19. The method of claim 17 wherein $$\overrightarrow{NOF_l} = \frac{(\overrightarrow{T_l} - C_l)_+}{\overrightarrow{T_l}}.$$

20. The method of claim 17 wherein $$\overrightarrow{NOF_l} = \frac{(\overrightarrow{T_l} - C_l)_+}{C_l - A_l},$$

whereas $A_l$ represents a constant non-compressible component of $\overrightarrow{T}_l$.

21. The method of claim 17 wherein $$\overrightarrow{NOF_l} = \frac{(\overrightarrow{T_l} - C_l)_+}{\overrightarrow{T_l} - A_l},$$

whereas $A_l$ represents a constant non-compressible component of $\overrightarrow{T}_l$.

22. The method of claim 17 wherein $$\overrightarrow{NOF_l} = \frac{(\overrightarrow{T_l} - C_l)_+}{1}.$$

23. The method of claim 22 wherein $$\overrightarrow{NOF_l} = \frac{(\overrightarrow{T_i} - C_i)_+}{C_i}.$$

24. The method of claim 22 wherein $$\overrightarrow{NOF_l} = \frac{(\overrightarrow{T_i} - C_i)_+}{\overrightarrow{T_i}}.$$

25. The method of claim 22 wherein $$\overrightarrow{NOF_l} = \frac{(\overrightarrow{T_i} - C_i)_+}{C_i - A_i},$$

whereas $A_l$ represents a constant non-compressible component of $\overrightarrow{T}_l$.

26. The method of claim 22 wherein $$\overrightarrow{NOF_l} = \frac{(\overrightarrow{T_i} - C_i)_+}{\overrightarrow{T_i} - A_i},$$

whereas $A_l$ represents a constant non-compressible component of $\overrightarrow{T}_l$.

27. The method of claim 22 wherein $$\overrightarrow{NOF_l} = \frac{(\overrightarrow{T_i} - C_i)_+}{1}.$$

28. The method of claim 1 wherein an aspect of the predicted overflow in an l'th output channel is reflected by $\overrightarrow{NOF}_l$.

29. The method of claim 1 wherein an aspect of the predicted overflow in an l'th output channel is reflected by $\overrightarrow{NOF}_l \cdot \overrightarrow{W}$, whereas $\overrightarrow{W}$ including weight factors, each weight factor representative of a previous time period.

30. The method of claim 29 wherein $$\overrightarrow{NOF_l} = \frac{(\overrightarrow{T_i} - C_i)_+}{C_i}.$$

31. The method of claim 29 wherein $$\overrightarrow{NOF_l} = \frac{(\overrightarrow{T_i} - C_i)_+}{\overrightarrow{T_i}}.$$

32. The method of claim 29 wherein $$\overrightarrow{NOF_l} = \frac{(\overrightarrow{T_i} - C_i)_+}{C_i - A_i},$$

whereas $A_l$ represents a constant non-compressible component of $\overrightarrow{T}_l$.

33. The method of claim 29 wherein $$\overrightarrow{NOF_l} = \frac{(\overrightarrow{T_i} - C_i)_+}{\overrightarrow{T_i} - A_i},$$

whereas $A_l$ represents a constant non-compressible component of $\overrightarrow{T}_l$.

34. The method of claim 33 wherein the output channel limitations comprise a maximal amount of media unit sequences that can be simultaneously transmitted over the output channel.

35. The method of claim 29 wherein $$\overrightarrow{NOF_l} = \frac{(\overrightarrow{T_i} - C_i)_+}{1}.$$

36. The method of claim 1 wherein an aspect of the predicted overflow in an l'th output channel reflects $\overrightarrow{NOF}_l$ and $\overrightarrow{P}$ whereas $\overrightarrow{P}$ is representative of a combination of priorities of media unit sequences allocated to an l'th output channel.

37. The method of claim 36 wherein the target function is $\max_{l \leq l \leq k} \|\overrightarrow{NOF}_l\|_s$, whereas $s \geq 1$.

38. The method of claim 36 wherein the target function is $\max_{l \leq l \leq k} \|\overrightarrow{NOF}_l\|_s$, whereas $s = \infty$.

39. The method of claim 36 wherein the target function is $$\sum_{i=1}^{k} \|\overrightarrow{NOF_i}\|_s,$$

whereas $s \geq 1$.

40. The method of claim 36 wherein the target function is $$\sum_{i=1}^{k} \|\overrightarrow{NOF_i}\|_s,$$

whereas $s = \infty$.

41. The method of claim 36 wherein the target function is $\max_{1 \leq l \leq k} \|\overrightarrow{NOF_l}\|_{s,w}$ whereas $s \geq 1$ and $w > 0$.

42. The method of claim 36 wherein the target function is $\max_{1 \leq l \leq k} \|\overrightarrow{NOF_l}\|_{s,w}$ whereas $s = \infty$ and $w > 0$.

43. The method of claim 36 wherein the target function is $$\sum_{i=1}^{k} \|\overrightarrow{NOF_i}\|_{s,w}$$

whereas $s \geq 1$ and $w > 0$.

44. The method of claim 36 wherein the target function is $$\sum_{i=1}^{k} \|\overrightarrow{NOF_i}\|_{s,w}$$

whereas $s = \infty$ and $w > 0$.

45. The method of claim 44 further comprising a step of multiplexing media unit sequences being allocated to the same output channel to provide an output channel multiplexed sequence.

46. The method of claim 45 wherein the step of compressing comprising a step of selecting at least one media unit sequence to be compressed in response to compression priority associated with each media unit sequence.

47. The method of claim 1 wherein the step of estimating comprising the step of calculating a target function, for each potential allocation.

48. The method of claim 1 further comprising a step of allocating the media unit sequences in response to the selected allocation.

49. The method of claim 48 further comprising a step of compressing at least one media unit sequence allocated to an output channel if the aggregate size of media unit sequences allocated to the output channel exceeds the output channel capacity.

50. The method of claim 49 wherein the step of compressing comprising a step of selecting at least one media unit sequence to be compressed in response to previous media unit sequence behavior pattern information.

51. The method of claim 50 wherein the allocation constraint reflect a relationship between a media unit sequence and at least one output channel.

52. The method of claim 50 wherein the allocation constraint reflect a relationship between at least two media unit sequence.

53. The method of claim 50 wherein the allocation constraint reflects output channel limitations.

54. The method of claim 1 wherein the potential allocation of media unit sequences respond to at least one allocation constraint.

55. The method of claim 1 wherein the at least one previous time period are selected from a group of a plurality of consecutive time periods.

56. The method of claim 1 wherein the length of a previous time period ranges between a second to a minute.

57. The method of claim 1 wherein the length of a previous time period ranges between a minute to an hour.

58. The method of claim 1 wherein the length of a previous time period ranges between an hour and a day.

59. The method of claim 1 wherein a media unit sequence is a program.

60. The method of claim 1 wherein the media unit sequences are MPEG compliant.

61. The method of claim 60 wherein the previous media unit sequence behavior pattern information during the previous time period is utilized to estimate a predicted overflow during a current time period.

62. The method of claim 60 wherein the previous media unit sequence behavior pattern information during the previous time period is utilized to estimate a predicted overflow during a future time period.

63. The method of claim 1 wherein the step of estimating comprising the steps of:

estimating, for each time period out of a plurality of previous time periods, at least one aspect of a predicted overflow in at least two output channels in response to the previous media unit sequence behavior pattern information during the previous time period and in response to at least two potential allocations of media unit sequences;

selecting a selected allocation out of the at least two potential allocations that optimizes the at least one aspect of the predicted overflow.

64. The method of claim 63 wherein the previous time period is spaced by at least one cycle period from the current time period.

* * * * *